June 6, 1933.   V. L. RONCI   1,912,405
GLASS WORKING MACHINE
Filed Aug. 3, 1929   4 Sheets-Sheet 4
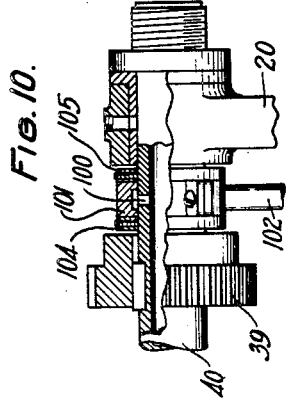
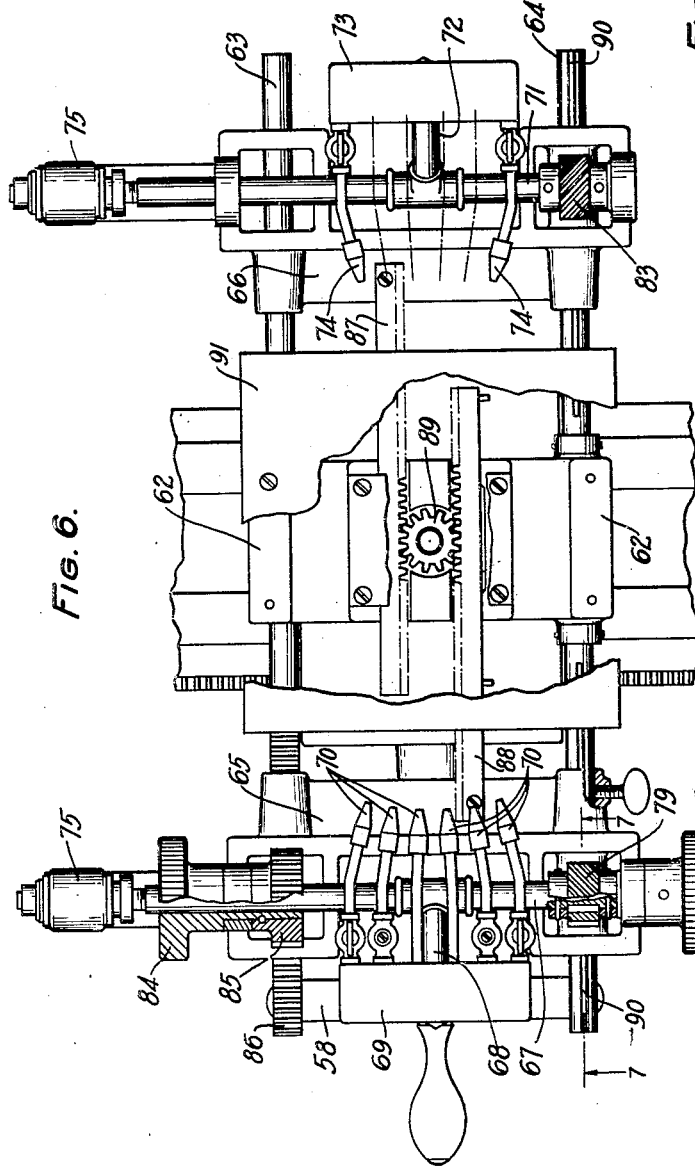
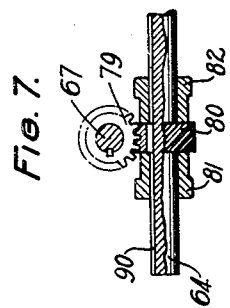
INVENTOR
V. L. RONCI
BY
Walter C. Kiesel
ATTORNEY Patented June 6, 1933

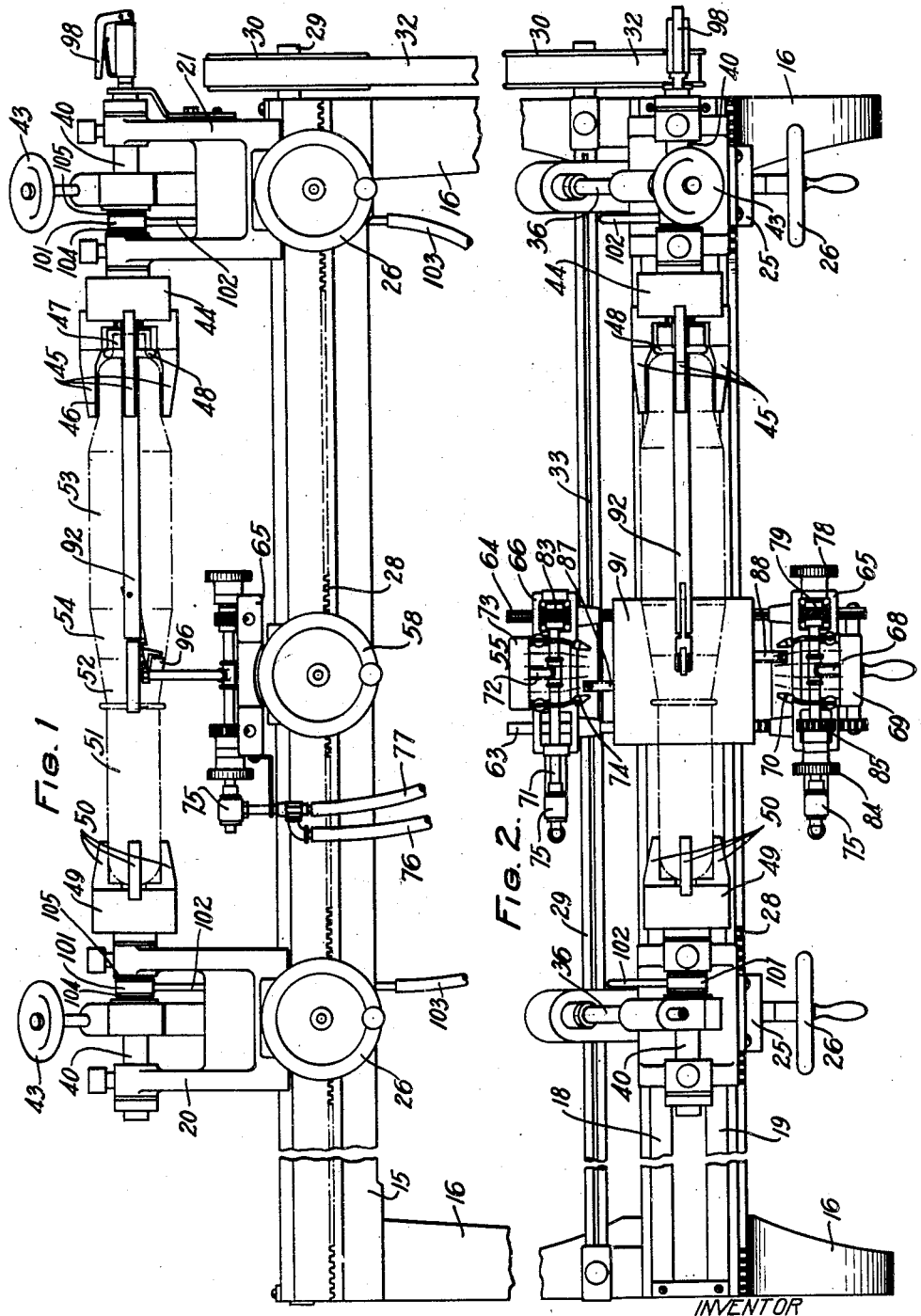

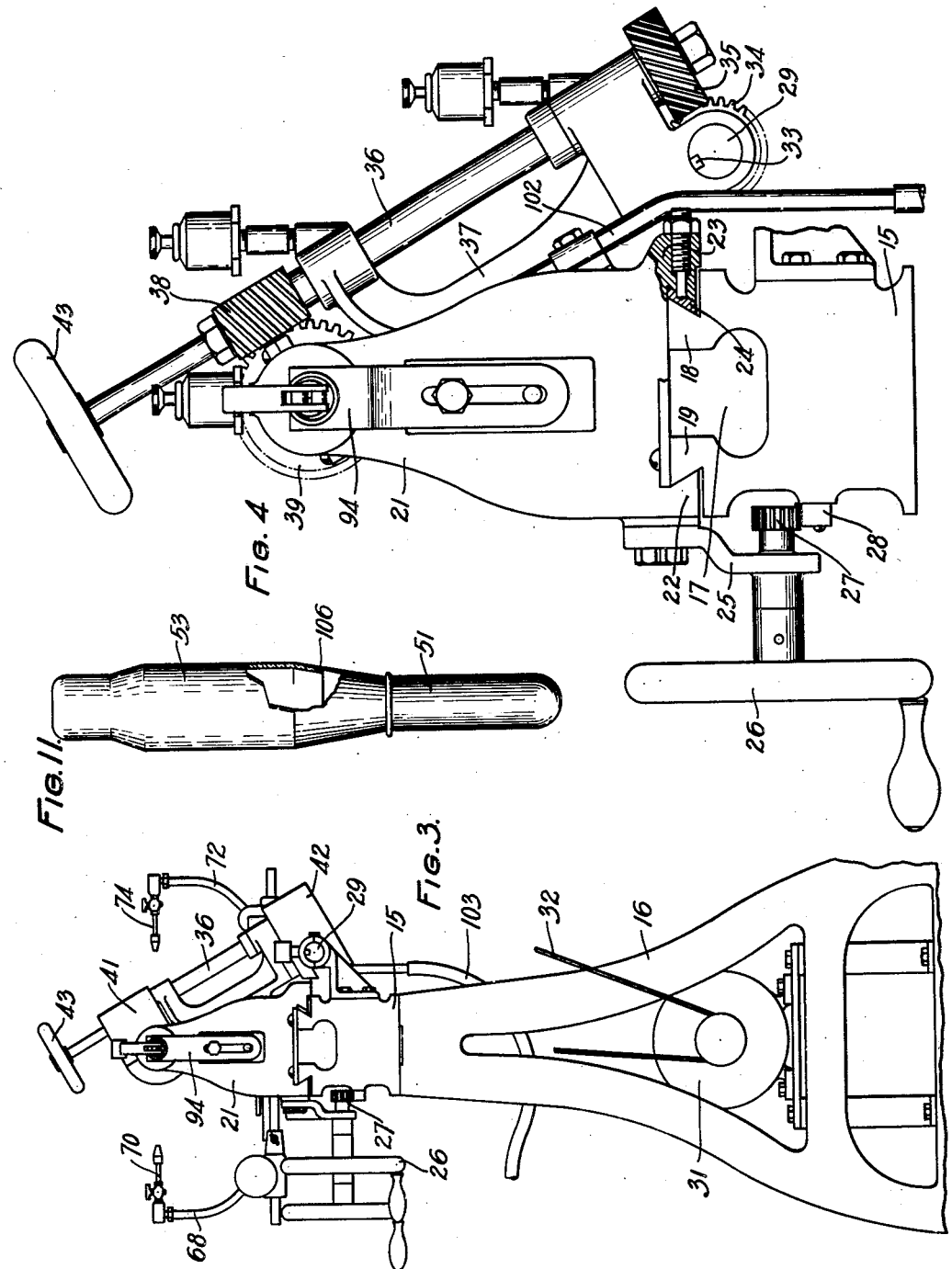

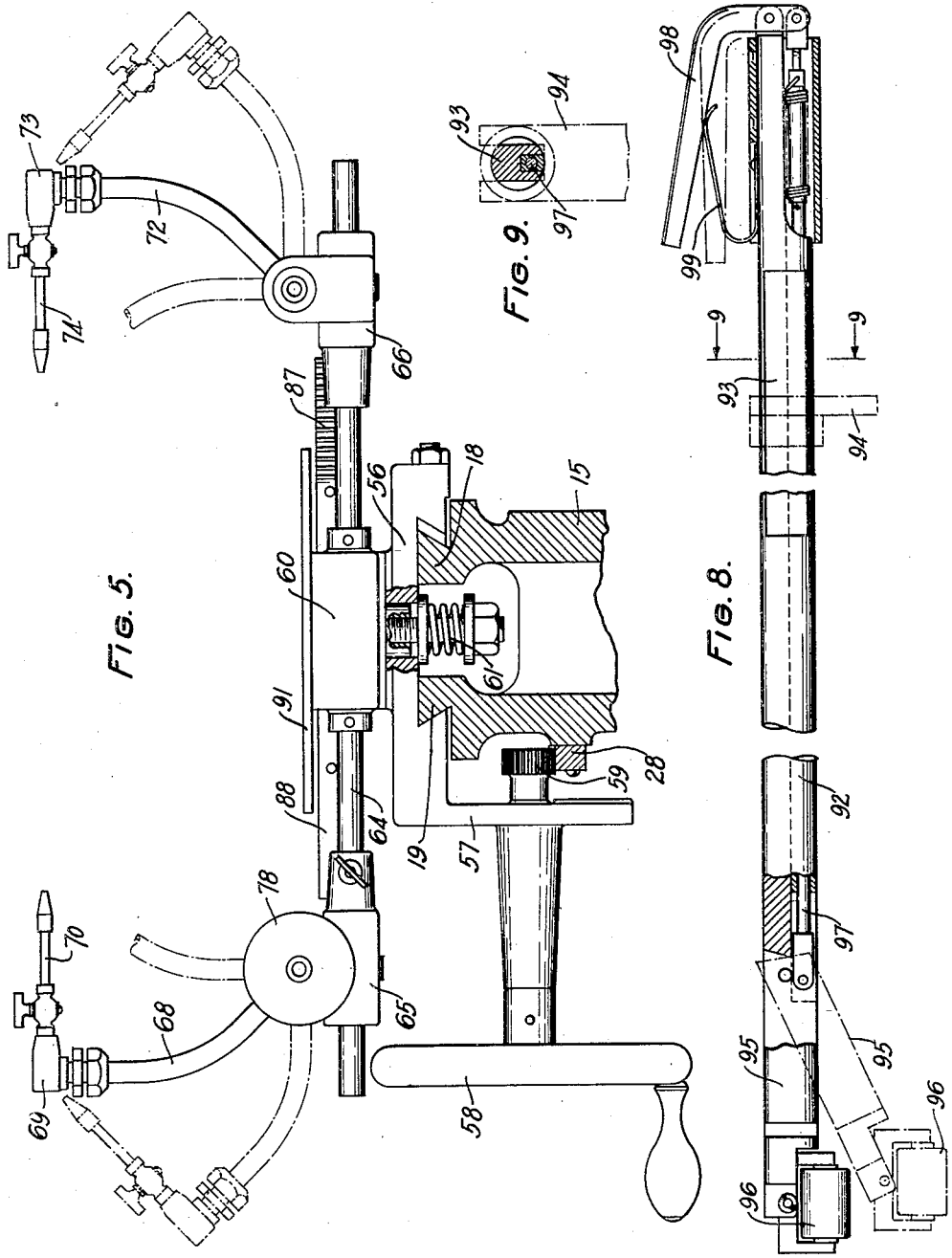

1,912,405

UNITED STATES PATENT OFFICE

VICTOR L. RONCI, OF BROOKLYN, NEW YORK, ASSIGNOR TO BELL TELEPHONE LABORATORIES, INCORPORATED, OF NEW YORK, N. Y., A CORPORATION OF NEW YORK

GLASS WORKING MACHINE

Application filed August 3, 1929. Serial No. 383,252.

This invention relates to glass working machines, and more particularly to such machines for sealing glass vessels or fusing a glass portion to a metal vessel.

An object of the invention is to form a uniform sealed joint between separate portions of glass or a glass portion and a metallic portion in an efficient manner and at low cost.

In accordance with one aspect of the invention, a joint between a cup-shaped anode portion and a cylindrical glass portion which form the enclosing vessel of a high power electron discharge device is mechanically produced by supporting the anode and glass portions in separate rotating heads positioned in opposed relation on a track base, one or both heads being adaptable for slidable movement along the base. A heater frame intermediate the supporting heads and adapted for reciprocating movement on the base fuses the free end of the rotating glass vessel to the metal anode portion when the ends of these members are brought into engagement by the slidable heads. The reciprocating heater maintains a uniform temperature in the fusing area of the rotating members and the axial and longitudinal alignment of the fused portions insures an efficient joint in which no mechanical strains are produced after the seal is completed.

A feature of the invention relates to a chuck or carrier on one of the heads for supporting the glass portion in operative relation to the rotating anode portion. This chuck comprises a member provided with fingers to engage the cylindrical wall of the glass portion and a frictional resilient ring coaxial with the chuck member surrounding the small dimension of the glass portion to coaxially align the glass portion with respect to the axis of the rotatable chuck. A similar chuck is also carried on the other head when two glass portions are fused together.

Another feature of the invention relates to an adjustable member extending into the glass portion and adapted to press the fused glass to the internal surface of the anode. This member comprises a stationary wiper arm having an extending roller at its inner end which is operated by a lever on the external end of the arm. The wiper roller engages the fused glass which is rotating in contact with the anode surface and presses the glass thereto to form an intimate joint.

A further feature of the invention relates to the accurate axial and longitudinal alignment of the rotating portions with respect to each other so that a smooth and uniform seal is produced between the metallic anode and the glass portion. This is accomplished by a common drive coupled to both heads to insure synchronous movement of these heads regardless of the position of each head on the track base.

Another feature of the invention relates to the adjustable means for directing the burner flame to various positions depending on the area of the fused parts held in the heads which are to be sealed.

Another feature of the invention relates to an arrangement for injecting air into the rotating glass portion during the fusing period to prevent collapse of the glass due to external pressure. This arrangement comprises a stationary sleeve member surrounding the rotating hollow shaft carried by the supporting head and a pipe coupling connected to a flexible hose to inject air into the rotating shaft which supports the glass enclosing vessel which is being fused. The air injected into the vessel maintains the fused glass in proper condition during the fusing operation to prevent collapse of the glass due to external pressure.

These and other features of the invention will be disclosed in the following detailed description in connection with the accompanying drawings in which Fig. 1 is a front view in elevation of the glass working machine made according to this invention showing the relative positions of the rotating heads and burner frame on the base with the metallic anode portion and the glass portion shown in dotted outline in their relative positions to form the sealed joint therebetween.

Fig. 2 is a plan view of Fig. 1 showing the common driving mechanism for driving the heads and the twin burner frame located between the heads.

Fig. 3 is an end view of the complete machine supported on a base and the connection of the head to the track base.

Fig. 4 is an enlarged detail view of the head with the guard casings removed to show the coupling means between the common drive shaft and the shaft on the head.

Fig. 5 is an enlarged detail view of the burner frame showing the various positions of the adjustable burners with parts in cross-section to show the swivel connection of the frame to the track base.

Fig. 6 is an enlarged plan view of the burner frame shown in Fig. 5 with parts broken away to show the detail construction.

Fig. 7 is an enlarged detail view of the gear coupling arrangement shown in Fig. 6 taken on the line 7—7.

Fig. 8 illustrates the adjustable wiper arm shown in Figs. 1 and 2 with parts broken away to show the detail construction.

Fig. 9 is an enlarged detail view in cross-section of the support for the arm shown in Fig. 8 taken on the line 9—9 of Fig. 8.

Fig. 10 is an enlarged detail view in cross-section of the air injecting arrangement shown in Fig. 1.

Fig. 11 illustrates the complete enclosing vessel of a high power electron discharge device with a portion broken away to show the uniform sealed joint between the metal portion and the glass portion.

Referring to the drawings, the glass working machine of this invention comprises a long lathe bed or track base 15 supported on end legs 16. The base is provided with a central channel 17 and parallel wedge-shaped tracks or rails 18 and 19. Supported on the track base are two similar U-shaped frame castings 20 and 21 which are coupled to the tracks 18 and 19 by cooperating jaws 22 and 23. As shown in Fig. 4, an insert 24 is held between the jaw 23 of the heads and the track 18 by a set screw. Rigidly attached to each head is a downwardly extending arm 25 which carries a hand wheel 26 having a gear 27 riding on a gear track 28 which extends along the length of the lathe bed 15. The rotation of the hand wheel moves the head longitudinally and slidably along the lathe bed 15. A common drive shaft 29 extends along the full length of the track base 15 and to the rear thereof and carries a pulley 30 which is connected to the motor 31 by a belt 32, the motor 31 being supported on a shelf carried by the leg support 16. The common drive shaft 29 is provided with a longitudinal slot or groove 33 which provides a keyway for two separate rotatable gears 34, one of which is shown in Fig. 4. The gear 34 is coupled to a spur gear 35 carried by shaft 36 extending at an angle through cast frame 37 on each head 20 and 21. A worm 38 carried by the shaft 36 is coupled to a gear 39 surrounding a hollow shaft 40 carried in the bearings on the U-shaped frame of the heads 20 and 21. The sliding gears 34 coupled to each head insures rotatable movement of the gear 39 on the head in any longitudinal position along the track base 15 due to the groove 33 in the shaft 29 since the turning of either of the hand wheels 26 attached to heads 20 and 21 causes the rotating gear 34 on the shaft 29 to move along with the slidable head attached to the hand wheel 26. A protective casing 41 surrounds the gear 39 on the head and the worm 38 on the shaft 36 and another casing 42 surrounds the gear 35 on the shaft 36 and the gear 34 on the longitudinal shaft 29. A hand wheel 43 is attached to the upper end of shaft 36 to facilitate rotatable movement of the hollow shaft 40 carried by the heads 20 and 21 when the motor 31 is not connected to the longitudinal shaft 29.

A rotatable chuck or carrier 44 attached to hollow shaft 40 on the slidable head 21 extends toward the slidable head 20 on the lathe bed 15 and is provided with adjustable jaws or fingers 45 having a facing of asbestos 46. A cup member 47 coaxial with the chuck 44 is surrounded by the jaws 45 and provided with a resilient ring 48 of rubber or similar material. Another chuck or carrier 49 attached to hollow shaft 40 extends from the slidable head 20 in coaxial and longitudinal alignment with the chuck 44 extending from the head 21. This chuck is also provided with jaws 50 which may be adjusted to securely clamp a cylindrical cup-shaped anode 51 having an outwardly extending flared end 52 which is tapered to a knife edge. The chuck 44 supports a cylindrical glass vessel 53 which is engaged by the adjustable jaws 45 and the small diameter of the glass vessel is surrounded by the resilient ring 48 within the chuck 44. This glass vessel has a tapered free end 54 which fits into the outwardly extending edge of the metallic anode 51 when either slidable head 20 or 21 is moved toward the other to bring the free ends of the anode and glass vessel into coaxial and longitudinal position. The composite enclosing vessel comprising the cylindrical cup-shaped anode portion 51 and the cylindrical glass enclosing portion 53 is utilized as the enclosing container of a high power electric discharge device similar to that disclosed in M. J. Kelly Patent 1,592,272, July 13, 1926, and since this container is highly evacuated it is necessary to form a tight sealed joint between the anode portion 51 and the glass portion 53. This type of joint and the method of producing the same is disclosed in W. G. Houskeeper Patent 1,294,466, February 18, 1919.

As shown in the Houskeeper patent, this type of seal is produced by fusing the glass to the tapered edge of the metal portion so that the thin edge of the metal portion readily welds to the glass portion and forms a permanent hermetic seal. In order to insure a tight seal free from mechanical defects, it is necessary to maintain the fused parts at a uniform high temperature to effect the weld between the metal and glass portions. This is accomplished in accordance with this invention by providing a carriage 55 on the bed 15 intermediate the heads 20 and 21 on the base. This carriage comprises a support 56 having jaws which engage the rails 18 and 19 on the base 15 the support having a downwardly extending arm 57 through which extends a shaft having a hand wheel 58 at one end and a spur gear 59 at the other end which engages the gear track 28 on the base 15. The burner carriage 55 is therefore slidable on the track base 15 and can easily be manipulated for reciprocating movement in the vicinity of the joined edges of the anode portion 51 and the glass portion 53 which comprises the area which must be maintained at a uniform temperature during the fusing operation. The support 56 carries a base 60 and is attached thereto by a swivel connection 61 to facilitate the swinging movement of the burner frame 55 when desired. The base 60 is provided with end sleeves 62 through which shafts 63 and 64 extend transverse to the direction of the track base 15 and parallel to each other. A pair of saddle castings 65 and 66 are supported on the free ends of the shafts 63 and 64. The saddle casting 65 supports a shaft 67 a portion of which is tubular and is coupled to a bent tubular arm 68 supporting a rectangular hollow casing 69 having a plurality of burner nozzles 70 projecting toward the base 15 of the machine. A similar shaft 71 is carried by the saddle casting 66 on the other ends of the shafts 63 and 64 and is coupled to an upwardly extending bent arm 72 which supports the casing 73 from which extend burner nozzles 74. It will be seen that the burner nozzles 70 and 74 extend in opposed relation in the same plane to direct an intensive burner flame toward the area of the metal anode portion 51 and the glass portion 53 held in the rotating chucks attached to the slidable heads on the base 15. Projecting from one end of each shaft 67 and 71 is a coupling 75 which connects with flexible hose connections 76 and 77 to inject a mixture of gas and air through a portion of the shaft 67 to the nozzles 70 and 74 projecting from the arms 68 and 72.

In order that the heating flame directed from the nozzles 70 and 74 may be adjusted to any desirable position to direct the flame to different local areas of the seal of the anode portion 51 and glass portion 53, the burner carriage 55 is adapted for universal movement to accomplish this result. As shown in detail in Fig. 6 the shaft 67 is provided with a knob 78 at one end and a worm gear 79 is rigidly attached to the shaft 67 adjacent the knob 78. The worm gear 79 meshes with a similar gear 80 coupled to the shaft 64 by shoulders 81 and 82 as shown in Fig. 7. A worm gear 83 similar to the worm gear 79 is rigidly attached to the shaft 71 extending across the saddle casting 66 and engages a gear (not shown) which is similarly attached to shaft 64 in a manner described in connection with gear 80 on shaft 64. It will be seen that the turning of knob 78 causes the arms 68 and 72 of each burner assembly to be moved through an arc to direct the flame from the burners to different areas of the parts rotating in the chucks held by the heads 20 and 21. Similarly, if it is desired to move the burner flames toward or away from the fusing area, a knob 84 loosely surrounding the other end of the shaft 67 is provided with a spur gear 85 which engages the notched end 86 of shaft 63 to move the saddle casting 65 and all parts supported thereon toward or away from the axis of the track base 15. In order to impart similar movement to the saddle casting 66 on the opposite end of the shafts, a pair of oppositely extending slidable toothed shafts 87 and 88 are attached at one end to each saddle casting 65 and 66 and engage a central gear 89 so that as the saddle casting 65 is moved along the notched end of shaft 63, the gear 80 surrounding shaft 64 also moves along this shaft due to the slot 90 allowing the free slidable movement of the gear 80 and the shoulders 81 and 82. As the saddle casting 65 is rigidly attached to the toothed shaft 88 which engages the gear 89, movement of this shaft also causes opposite movement of the toothed shaft 87 which is attached to the saddle casting 66 so that as the saddle casting 65 is moved toward or away from the axis of the track base 15, the saddle casting 66 will be similarly moved so that the burner flame from the nozzles 70 and 74 can be adjusted for longitudinal movement. A plate 91 of asbestos is fastened to the supporting box 60 to prevent particles of broken glass interfering with the movement of the track shafts 87 and 88.

A stationary arm having a cylindrical portion 92 and a flattened portion 93 extends through the hollow shaft 40 of the slidable head 21 and is supported therefrom by a slotted arm 94 as shown clearly in Fig. 9. This arm extends into the glass portion and is provided with a pivoted extending portion 95 carrying a loose roller 96 at its inner end. The pivoted portion 95 is connected to a link member 97 which extends through the cylindrical portion 92 and the flat portion 93 of the arm and is connected at its outer end to a lever 78 pivoted to the flat portion 93. A spring 99 holds the pivoted portion 95 in normal alignment with the other portions of the arm. When the free end of the glass portion 54 within the tapered end 52 of the anode 51 is heated to a plastic state the lever 98 on the arm is operated to swing the pivoted portion 95 to a position as shown in dotted outline in Fig. 8 whereby the roller 96 is brought into engagement with the plastic glass as shown in Fig. 1 and the rotation of the anode and glass portions causes the roller to press the plastic glass against the inner tapered surface of the anode 51. After the pressing operation has been completed, the lever 98 on the external end of the arm is released and the roller is returned to its normal longitudinal position out of engagement with the glass surface.

Since the high temperature maintained by the burners directed toward the glass and anode portions rotating in the heads will eventually cause collapse of the glass portion in the heated area due to the external pressure being greater than the internal pressure it is necessary to force air into the vessel to maintain the shape of the glass. This is accomplished in accordance with this invention by providing an air injecting arrangement to maintain the internal pressure at approximately the same as the external pressure until the fusing operation is completed. The hollow shaft 40 is provided with a plurality of holes 100 and surrounding the holes in the shaft is a stationary sleeve 101 which is connected to a pipe 102 coupled to a hose connection 103. A pair of collars 104 and 105 are arranged on opposite sides of the sleeve 101 to maintain the sleeve in position on the hollow shaft 40. This arrangement facilitates the injection of air into the glass vessel to maintain a uniform internal pressure to prevent the collapse of the plastic glass during the fusing period. A similar air injecting connection surrounds the shaft 40 carried by the head 20 so that if two glass vessels are held by the chucks 44 and 49, air can be injected from both ends. In Fig. 11 is shown the completed composite container which consists of the metallic cup-shaped anode portion 51 and the glass portion 53 and shows the uniform tight joint 106 formed between the tapered edge of the anode portion 51 and the glass portion 53 and produces a sealed joint having a smooth surface and uniform strength so that no weak spots are evident when the seal is completed.

While the invention has been disclosed as showing the operations for sealing a metal portion to a glass portion, it is of course understood that the machine may be adapted for other kinds of seals such as between two glass portions held in opposing rotating heads. Furthermore the machine of this invention may be adapted for other types of glass working to be done on large enclosing vessels for discharge devices and the invention is only to be limited within the scope of the appended claims.

What is claimed is:

1. A sealing machine comprising a base portion, a head on each end of said base, a rotatable carrier extending from each head in opposed relation, one of said carriers adapted to support a metallic receptacle and the other carrier adapted to support a glass portion, means for slidably moving one of said heads toward the other to join the free ends of said metallic receptacle and glass portion, means slidable on said base for sealing the joined ends of said receptacle and glass portion, and means extending through one of said heads operatively engaging the joint between the metallic receptacle and the glass portion.

2. A glass working machine comprising a base, a pair of heads movable along said base, a carrier member supported by each of said heads, a shaft, driving means slidably attached to said shaft, coupling means between said carrier and said driving means, and means attached to each head for moving said heads, carriers and driving means longitudinally along said base.

3. A glass working machine comprising a base, a head slidably movable along said base, a carrier member rotatable on said head adapted to support a cylindrical glass vessel, a stationary arm extending through said head and member, and adjustable means carried by said arm for wiping the edge of the cylindrical glass vessel.

4. A glass working machine comprising a base, a head having a hollow shaft movable along said base, a carrier member rotatable on said shaft, a stationary member extending through said shaft and carrier, a pivoted roller on one end of said stationary member, and operative means on the other end of said member coupled to said pivoted roller.

5. A glass working machine comprising a base, a head movable along said base, a carrier member adapted to support a glass vessel, a longitudinally movable frame on said base, a swivel base attached to said frame, a pair of opposed forked burners on said swivel base, and adjustable means adjacent one of said burners adapted to be operated to move said pair of burners in arcuate and transverse directions to the longitudinal movement of said frame.

6. A glass working machine comprising a base, a head having a hollow shaft movable along said base, a carrier member rotatable on said shaft, a wiper arm extending through said head and carrier, and means supporting said arm exterior to said head.

7. A glass working machine comprising a base, a head having a hollow shaft movable along said base, a carrier member rotatable on said shaft, an axial arm extending through said shaft and carrier, a wiping member carried on one end of said arm, and means attached to said head supporting the other end of said arm.

8. A glass working machine comprising a base, a head having a hollow shaft movable along said base, a carrier member rotatable on said shaft, an arm having a pivoted portion extending through said shaft and carrier, a wiper member supported on said pivoted portion, an actuating lever on one end of said arm, and a link member connecting said pivoted portion with said actuating lever.

9. A glass working machine comprising a base, a head movable along said base, a rotatable carrier on said head adapted to support refractory material, a longitudinally movable saddle on said base, a platform on said saddle, a plurality of opposed burners on said platform, coacting means for simultaneously changing the position of said burners in a vertical arcuate direction, other coacting means for simultaneously varying the position of said burners transverse to the longitudinally movable saddle, and centrally yieldable means connecting said platform to said saddle of such character that said burners may be rotated about an axis of said saddle.

10. A glass working machine comprising a base, a head movable along said base, a rotatable carrier on said head adapted to support refractory material, a longitudinally movable saddle on said base, parallel members attached to said saddle, a pair of supports extending between the ends of said members, a set of burners extending above each support, and means on one of said supports for controlling the position of said burners on the other support.

11. A glass working machine comprising a base, a head movable along said base, a rotatable carrier on said head adapted to support refractory material, a longitudinally movable saddle on said base, parallel members attached to said saddle, a pair of supports extending between the ends of said members, a set of burners extending above each support, a pair of opposed parallel racks attached to said supports, and extending through said saddle, and a pinion carried by said saddle engaging said racks.

In witness whereof, I hereunto subscribe my name this 2nd day of August, 1929.

VICTOR L. RONCI.